United States Patent
Tellakula et al.

(10) Patent No.: US 12,129,424 B2
(45) Date of Patent: Oct. 29, 2024

(54) FRICTION REDUCERS FOR HIGH TDS BRINES

(71) Applicant: Sterling Specialty Chemicals Holding UK Limited, Harrow (GB)

(72) Inventors: Roopa Tellakula, Suwanee, GA (US); Louis Rosati, Atlanta, GA (US); Ronald Robinson, Newnan, GA (US); Samuel Hanson, Atlanta, GA (US)

(73) Assignee: STERLING SPECIALTY CHEMICALS HOLDING UK LIMITED (GB)

( * ) Notice: Subject to any disclaimer, the term of this patent is extended or adjusted under 35 U.S.C. 154(b) by 0 days.

(21) Appl. No.: 17/629,729

(22) PCT Filed: Jul. 20, 2020

(86) PCT No.: PCT/US2020/042719
§ 371 (c)(1),
(2) Date: Jan. 24, 2022

(87) PCT Pub. No.: WO2021/016155
PCT Pub. Date: Jan. 28, 2021

(65) Prior Publication Data
US 2023/0019003 A1    Jan. 19, 2023

Related U.S. Application Data

(60) Provisional application No. 62/876,207, filed on Jul. 19, 2019.

(30) Foreign Application Priority Data

Oct. 9, 2019   (FI) ..................................... 20195745

(51) Int. Cl.
*C09K 8/36* (2006.01)
*C09K 8/68* (2006.01)
(Continued)

(52) U.S. Cl.
CPC .................. *C09K 8/36* (2013.01); *C09K 8/68* (2013.01); *C09K 8/80* (2013.01); *C09K 8/88* (2013.01); *C09K 2208/28* (2013.01)

(58) Field of Classification Search
None
See application file for complete search history.

(56) References Cited

U.S. PATENT DOCUMENTS 9,315,722 B1    4/2016    Jackson
2014/0144643 A1    5/2014    Frederick et al.
(Continued)

FOREIGN PATENT DOCUMENTS

WO    WO 2018045282    *    3/2018
WO    2019/046198 A1    3/2019

OTHER PUBLICATIONS

Dow Surfactant Reference Chart; The Dow Chemical Company; 2022. (Year: 2022).*
(Continued)

*Primary Examiner* — Andrew Sue-Ako
(74) *Attorney, Agent, or Firm* — Dilworth IP, LLC

(57) ABSTRACT

Emulsions, treatment fluids and methods for treating subterranean formations are provided, wherein the emulsions comprise water, a water-immiscible liquid, one or more polymers, and an inverting surfactant composition comprising one or more surfactants selected from the group consisting of ethoxylated alcohol compounds, ethoxylated fatty acid compounds, and alkyl polyethyleneglycol ether carboxylic acid compounds, and salts or esters thereof. The emulsions are particularly suitable for use in brine.

10 Claims, 5 Drawing Sheets

(51) Int. Cl.
    *C09K 8/80*    (2006.01)
    *C09K 8/88*    (2006.01)

(56) References Cited

U.S. PATENT DOCUMENTS

2017/0096597 A1*  4/2017  Hu ........................ C09K 8/602
2017/0158948 A1   6/2017  Kim
2017/0335175 A1   11/2017 Oliveira et al.
2017/0362487 A1   12/2017 Waterman et al.
2018/0362833 A1   12/2018 Jackson et al.
2019/0211255 A1   7/2019  Tellakula

OTHER PUBLICATIONS

International Search Report and Written Opinion, PCT/US2020/042719, dated Oct. 28, 2020 (9 pp.).
Canadian Office Action issued in App. No. CA3144194, dated Mar. 8, 2024, 5 pages.

* cited by examiner

FRICTION REDUCERS FOR HIGH TDS BRINES

CROSS-REFERENCE TO RELATED APPLICATIONS

This application is the U.S. national stage of International Application No. PCT/US2020/042719, filed Jul. 20, 2020, which claims priority to U.S. Provisional Application No. 62/876,207, filed Jul. 19, 2019, and Finnish Patent Application No. 20195745, filed Sep. 10, 2019, all of which is incorporated herein by reference in their entireties.

FIELD OF THE ART

The present disclosure generally relates to emulsions, treatment fluids and methods for treating subterranean formations. More particularly, it relates to the use of friction reducing compositions for use in brines with a high level of total dissolved solids (TDS).

BACKGROUND

In the drilling, completion, and stimulation of oil and gas wells, well treatment fluids are often pumped into well bore holes under high pressure and at high flow rates causing the rock formation surrounding the well bore to fracture. As the fluid is pumped through the pipe at high flow rates there is a significant amount of frictional resistance, which results in large energy requirements.

Friction reducing additives have been known and added to treatment fluids to reduce pump pressure. For example, a type of well treatment commonly utilized for stimulating hydrocarbon production from a subterranean zone penetrated by a well bore is hydraulic fracturing. Hydraulic fracturing, also referred to as fracing (or fracking), is used to initiate production in low-permeability reservoirs and re-stimulate production in older producing wells. In hydraulic fracing, a fluid composition is injected into the well at pressures effective to cause fractures in the surrounding rock formation. Fracing is used both to open up fractures already present in the formation and to create new fractures.

Water soluble polymers can be used as friction reducers in well treatment fluids to alter the rheological properties of the fluid so that the turbulent flow is reduced, thereby preventing consequent energy loss in the fluid as it is pumped through the pipe. In some instances, water soluble friction reducing polymers are dispersed in water-in-oil emulsions, wherein upon addition to the aqueous treatment fluid, the emulsion inverts to release the friction reducing polymer into the fluid. Performance in the field depends (at least in part) upon the ability of the emulsions to invert, or break, quickly. Certain conditions, for example high brine conditions, can hinder the inversion of the emulsion. In particular, high brines including potassium chloride, sodium chloride, seawater and other American Petroleum Institute base brines that include barium, strontium, iron, calcium or magnesium hardness can interfere with the inversion of emulsion polymers.

BRIEF SUMMARY

Disclosed herein are emulsions comprising: water; a water-immiscible liquid; greater than about 10% by weight of one or more polymers, wherein the one or more polymers includes acrylamide and one or more anionic monomers, and salts thereof; and from about 1% to about 5% by weight of an inverting surfactant composition that includes one or more surfactants selected from alkyl polyethyleneglycol ether carboxylic acid compounds, ethoxylated fatty acid compounds, and ethoxylated alcohol compounds, and salts or esters thereof, wherein the inverting surfactant composition comprises greater than about 50% by weight of alkyl polyethyleneglycol ether carboxylic acid compounds, and if the polymer is a copolymer of acrylamide and acrylic acid, the inverting surfactant compositions comprises at least an ethoxylated alcohol compound.

Treatment fluids comprising the emulsions, methods of treating subterranean formations with the emulsions and/or treatment fluids, and methods of improving the friction reducing properties of an aqueous treatment fluid, also are provided.

The disclosure may be understood more readily by reference to the following detailed description of the various features of the disclosure and the examples included therein.

DETAILED DESCRIPTION

Figure 1:
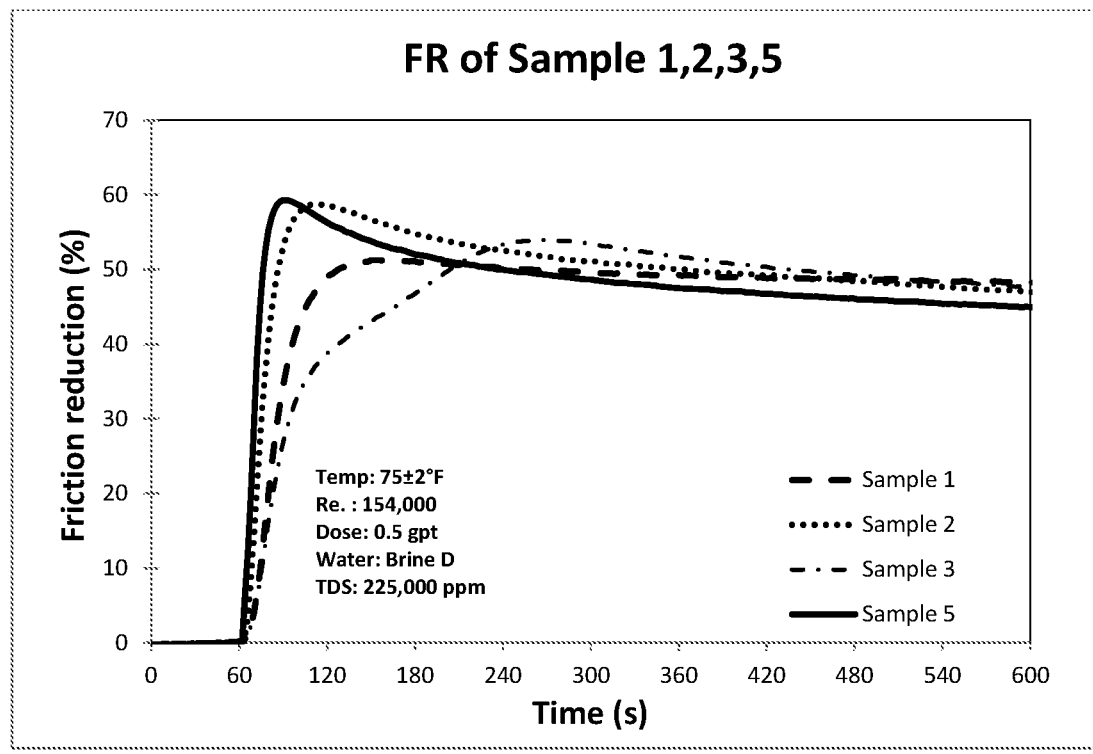
FIG. 1 shows the Friction Reduction performance of Example 1, samples 1-3, and 5 in Brine D at 0.5 gpt.

The present disclosure provides aqueous treatment fluids and methods for their use in aqueous brines. The aqueous treatment fluids utilize an advantageous combination of an anionic acrylamide polymer and an inverting surfactant composition which comprises one or more surfactants selected from the group consisting of alkyl polyethylene glycol ether carboxylic acid compounds, ethoxylated fatty acid compounds, and ethoxylated alcohol compounds, and salts or esters thereof, wherein the inverting surfactant composition comprises greater than about 50% by weight of alkyl polyethyleneglycol ether carboxylic acid compounds, and if the polymer is a copolymer of acrylamide and acrylic acid, the inverting surfactant compositions comprises at least an ethoxylated alcohol compound.

The exemplary emulsions, treatment fluids and methods may be used to provide rapid and enhanced friction reduction in aqueous brines, for example in harsh brine conditions. The exemplary emulsions, treatment fluids and methods may be used at a range of temperatures, even at low temperatures, without loss of polymer performance.

In exemplary embodiments, the emulsions, treatment fluids and methods can be used to carry proppants into fractures, for example in fracturing applications. High molecular weight polyacrylamides are commonly used in fracturing applications as a friction reducer. Generally, crosslinked fluids are used to carry proppants into the fractures, which typically requires additional chemicals, such as crosslinkers, buffers and breakers, to be incorporated into the fracturing fluid. In exemplary embodiments, the emulsions and treatment fluid can be used to carry proppant while minimizing the use of other chemicals or additives typically required by crosslinked fluids.

In hydraulic fracturing, the treatment water typically includes a friction reducer. Such frac fluids typically have low viscosities, and consequently, a higher injection flow rate can be used to carry proppant. The exemplary emulsions, treatment fluids and methods can be used in hydraulic fracturing applications. Advantageously, the exemplary emulsions and treatment fluids can be used in high brines with very fast inversion of the emulsion, very good friction reduction, and with good proppant carrying capabilities at higher loadings.

Polymers

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. A polymer may also be a "terpolymer" which comprises three or more different recurring units. The term "polymer" as used herein is intended to include both the acid form of the polymer as well as its various salts.

In exemplary embodiments, the polymer is an emulsion polyacrylamide, for example an emulsion polyacrylamide that can be used as a friction-reducing polymer. The term "friction reducing polymer" refers to a polymer that reduces energy losses due to friction between an aqueous fluid in turbulent flow and tubular goods, e.g. pipes, coiled tubing, and the like, and/or formations. Although a variety of friction reducing polymers are known in the art, including synthetic polymers such as poly(ethylene oxide), poly (acrylic acid), acrylamide, and poly(N-vinyl formamide), natural polymers such as xanthan gum, guar gum, carboxymethyl cellulose, and DNA, and viscoelastic surfactants, not all possess adequate compatibility with brine. The inventors have discovered that emulsions prepared using anionic polymers comprising acrylamide and one or more anionic monomers, in combination with certain surfactants, exhibit superior friction reduction in high TDS brines, when compared to conventional emulsions.

In exemplary embodiments, the polymer is an emulsion polyacrylamide (EPAM). EPAMs generally are inverse emulsions (i.e., water-in-oil emulsions) in which water droplets containing a water-soluble polymer are dispersed in an oil phase. In exemplary embodiments, a water-soluble acrylamide polymer is dissolved in the water droplets that constitute the dispersed phase.

In exemplary embodiments, the polymer is a polymer useful for enhanced oil recovery applications. The term "enhanced oil recovery" or "EOR" (also known as tertiary mineral oil production) refers to a process for mineral oil production in which an aqueous injection fluid comprising at least a water-soluble polymer is injected into a mineral oil deposit. The techniques of tertiary mineral oil production include what is known as "polymer flooding". Polymer flooding involves injecting an aqueous solution of a water-soluble thickening polymer through the injection boreholes into the mineral oil deposit. As a result of the injection of the polymer solution, the mineral oil is forced through the cavities in the formation, proceeding from the injection borehole, in the direction of the production borehole, and the mineral oil is produced through the production borehole. By virtue of the fact that the polymer formulation has an increased viscosity as compared to the viscosity of water, the risk is reduced that the polymer formulation breaks through to the production borehole. It is thus possible to mobilize additional mineral oil in the formation. Details of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010". For polymer flooding, a multitude of different water-soluble thickening polymers have been proposed, especially high molecular weight polyacrylamide, copolymers of acrylamide and further comonomers, for example vinylsulfonic acid or acrylic acid. Polyacrylamide may be partly hydrolyzed polyacrylamide, in which some of the acrylamide units have been hydrolyzed to acrylic acid. It is known in the art to use inverse emulsions of certain polyacrylamide (co)polymers for enhanced oil recovery (EOR) in particular for use on off-shore platforms. Such inverse emulsions typically comprise about 30 wt. % of polymers. For use, inverse emulsions are simply diluted with water to the final concentration of the polymer.

In exemplary embodiments, the one or more polymers is a water soluble, acrylamide-containing copolymer or terpolymer. In exemplary embodiments, the one or more polymers comprises acrylamide or partially hydrolyzed acrylamide, and one or more anionic monomers. The term "anionic monomer" refers to a monomer that possesses a negative charge. Throughout this description, the terms "anionic monomer" or "anionic monomers" denotes an anionic monomer selected from the group consisting of acrylamido-tert-butyl sulfonic acid (ATBS), acrylic acid, sodium acrylate, ammonium, acrylate, methacrylic acid, vinyl sulfonic acid, styrene sulfonic acid, maleic acid, sulfopropyl acrylate or methacrylate or other water-soluble forms of these or other polymerizable carboxylic or sulphonic acids, sulfomethylated acrylamide, allyl sulfonate, itaconic acid, acrylamidomethylbutanoic acid, fumaric acid, vinylphosphonic acid, allylphosphonic acid, phosphonomethylated actylamide, methacrylate, itaconate, 2-acrylamido 2-methyl propane sulphonate, sulfoalkyl(meth)acrylic acids, sulfonated styrenes, unsaturated dicarboxylic acids, sulfoalkyl (meth)acrylamides, vinyl acetate, n-vinylformamide, n-vinylacetamide, n-vinylcaprolactam, n-vinylimidazole, n-vinylpyridine, n-vinylpyrrolidone, acrylamidopropyltrimonium chloride, salts of said acids and the like, or another anionic ethylenically unsaturated compound. In one embodiment, the anionic monomer is selected from acrylamido-tert-butyl sulfonic acid (ATBS), acrylic acid (AA), and salts and combinations thereof. Exemplary salts of these anionic monomers include, but are not limited to, sodium and ammonium salts. In a particular embodiment, the anionic polymer has about 5% to about 40% charge, about 10% to about 30% charge, or about 15% to about 20% charge.

In exemplary embodiments, the one or more polymers comprises at least about 60 mole %, about 70 mole %, about 80 mole %, about 90 mole %, or about 95 mole % acrylamide. In exemplary embodiments, the one or more polymers comprises at least about 5 mole %, about 10 mole %, about 20 mole %, about 30 mole %, or about 40 mole % of one or more anionic monomers. In exemplary embodiments, the one or more polymers comprises about 60 mole % to about 95 mole %, about 70 mole % to about 90 mole %, or about 80 mole % to about 85 mole % acrylamide. In exemplary embodiments, the one or more polymers comprises about 5 mole % to about 40 mole %, about 10 mole % to about 30 mole %, or about 15 mole % to about 20 mole % of one or more anionic monomers. Throughout this description, it will be understood that the disclosure of ranges includes all values within those ranges, and thus, a range of about 60 mole % to about 95 mole % includes, for example, 63 mole %, or 78 mole %, and the like.

The exemplary polymers may be included in the treatment fluids in an amount sufficient to provide the desired properties. In some embodiments, a polymer may be present in an amount in the range of about 0.1 to about 20, about 0.1 to about 10, about 0.1 to about 6, about 0.1 to about 5, or about 0.25 to about 1, Gallons Per Thousand Gallons of the aqueous treatment fluid (GPTG). In other embodiments, the polymer is added at a concentration of about 0.25 to about 6 GPTG of treatment fluid.

The polymers of the present embodiments should have a molecular weight sufficient to provide desired properties. For example, those polymers used for friction reduction should have higher molecular weights to provide a desirable level of friction reduction. The polymers used for EOR applications should have sufficient molecular weight to provide the desired viscosity to mobilize oil in a desirable manner. In some exemplary embodiments, the weight average molecular weight of a polymer may be in the range of from about 7,500,000 to about 30,000,000 Dalton. Those of ordinary skill in the art will recognize that polymers having molecular weights outside the listed range may still provide desirable properties in the aqueous treatment fluid.

In exemplary embodiments, the polymer is used for EOR applications.

Suitable polymers of the present embodiments may be in an acid form or in a salt form. A variety of salts may be made by neutralizing the acid form of a monomer, for example 2-acrylamido-2-methylpropane sulfonic acid, and/or acrylic acid, with a base, such as sodium hydroxide, ammonium hydroxide or the like. As used herein, the term "polymer" is intended to include both the acid form of the copolymer and its various salts.

Inverting Surfactant Composition

In exemplary embodiments, in addition to the one or more polymers, the emulsion or aqueous treatment fluid comprises an inverting surfactant composition. Among other things, an inverting surfactant or inverting surfactant composition may facilitate the inverting of the water-in-oil emulsion upon addition to the aqueous treatment fluids of the present embodiments. As those of ordinary skill in the art will appreciate, with the benefit of this disclosure, upon addition to the treatment fluid, the emulsion should invert, releasing the polymer into the treatment fluid.

In exemplary embodiments, the inverting surfactant composition comprises one or more surfactants selected from the group consisting of Surfactant A compounds, Surfactant B compounds, and Surfactant C compounds, as described herein. In certain exemplary embodiments, the inverting surfactant composition comprises one or more surfactants selected from the group consisting of Surfactant A compounds. In certain exemplary embodiments, the inverting surfactant composition comprises one or more surfactants selected from the group consisting of Surfactant B compounds.

In exemplary embodiments, the inverting surfactant composition comprises two or more surfactants selected from the group consisting of Surfactant A compounds, Surfactant B compounds, and Surfactant C compounds, as described herein.

In exemplary embodiments, the inverting surfactant composition comprises one or more Surfactant A compounds. In exemplary embodiments, the inverting surfactant composition comprises one or more Surfactant B compounds. In exemplary embodiments, the inverting surfactant composition comprises one or more Surfactant C compounds.

In exemplary embodiments, the inverting surfactant composition comprises one or more Surfactant A compounds and one or more Surfactant B compounds. In exemplary embodiments, the inverting surfactant composition comprises one or more Surfactant A compounds and one or more Surfactant C compounds. In exemplary embodiments, the inverting surfactant composition comprises one or more Surfactant B compounds and one or more Surfactant C compounds. In exemplary embodiments, the inverting surfactant composition comprises two or more types of Surfactant B compounds.

In exemplary embodiments, the inverting surfactant composition comprises one or more Surfactant A compounds, one or more Surfactant B compounds, and one or more Surfactant C compounds. In exemplary embodiments, the inverting surfactant composition comprises one or more Surfactant A compounds, and two or more types of Surfactant B compounds. In exemplary embodiments, the inverting surfactant composition comprises one or more Surfactant C compounds, and two or more types of Surfactant B compounds.

In exemplary embodiments, the inverting surfactant composition comprises one or more Surfactant A compounds, two or more types of Surfactant B compounds, and one or more Surfactant C compounds.

In exemplary embodiments, the inverting surfactant composition may comprise other inverting surfactants in addition to those chosen from Surfactant A, Surfactant B, and Surfactant C compounds. Representative inverting surfactants that may also be added to the exemplary emulsions include those having a hydrophilic-lipophilic balance (HLB) of greater than 10; polyoxyethylene sorbitol tetraoleate; polyethylene glycol monooleate; ethoxylated alcohols, such as C12-14 branched ethoxylated alcohol, ethoxylated octyl and nonyl phenols; ethoxylated nonyl phenol formaldehyde resin; polyethylene oxide esters of fatty acids; dioctyl esters of sodium sulfosuccinate; and other inverting surfactants disclosed in U.S. Pat. No. 3,624,019 incorporated herein by reference. The inverting surfactant should be present in an amount sufficient to provide the desired inversion of the emulsion upon contact with the water in the aqueous treatment fluid.

In describing the respective amounts of surfactants present in the inverting surfactant composition, the respective amounts refer to the amount of the specific surfactant in only the surfactant composition, not the overall emulsion, or treatment fluid. In exemplary embodiments, the inverting surfactant composition comprises 0 to about 100%, 0 to about 75%, or about 5 to about 75 wt %, of Surfactant A compounds. In exemplary embodiments, the inverting surfactant composition comprises at least about 5, about 10, about 15, about 20, about 25, about 30, about 35, about 40, about 50, about 55, about 60, about 65, about 70, about 75, about 80, about 85, about 90, or about 95 wt % of Surfactant A compounds, when Surfactant A is included in the composition. In certain exemplary embodiments, the inverting surfactant composition comprises more than about 50% by weight of Surfactant A compounds.

In exemplary embodiments, the inverting surfactant composition comprises 0 to about 100%, 0 to about 75%, or about 5 to about 75 wt %, of Surfactant B compounds. In exemplary embodiments, the inverting surfactant composition comprises at least about 5, about 10, about 15, about 20, about 25, about 30, about 35, about 40, about 50, about 55, about 60, about 65, about 70, about 75, about 80, about 85, about 90, or about 95 wt % of Surfactant B compounds, when Surfactant B is included in the composition. In certain exemplary embodiments, the inverting surfactant composition does not comprise Surfactant B compounds.

In exemplary embodiments, the inverting surfactant composition comprises 0 to about 75%, or about 5 to about 50 wt %, of Surfactant C compounds. In exemplary embodiments, the inverting surfactant composition comprises at least about 5, about 10, about 15, about 20, about 25, about 30, about 35, about 40, or about 50 wt % of Surfactant C compounds, when Surfactant C is included in the composition. In certain exemplary embodiments, the inverting surfactant composition does not comprise Surfactant C compounds.

In certain exemplary embodiments, the inverting surfactant composition comprises or consists essentially of about 5 to about 95 wt % of one or more Surfactant A compounds and about 5 to about 95 wt % of one or more Surfactant B compounds. In certain exemplary embodiments, the inverting surfactant composition comprises or consists essentially of about 25 to about 35 wt % of one or more Surfactant A compounds and about 65 to about 75 wt % of one or more Surfactant B compounds.

In certain exemplary embodiments, the inverting surfactant composition comprises or consists essentially of about 5 to about 95 wt % of one or more Surfactant A compounds and about 5 to about 75 wt % of one or more Surfactant C compounds. In certain exemplary embodiments, the inverting surfactant composition comprises or consists essentially of about 5 to about 95 wt % of one or more Surfactant B compounds and about 5 to about 75 wt % of one or more Surfactant C compounds. In certain exemplary embodiments, the inverting surfactant composition comprises or consists essentially of about 25 to about 65, about 25 to about 55, about 30 to about 50, or about 30 to about 60, wt % of one or more Surfactant B compounds and about 35 to about 75, about 45 to about 75, about 40 to about 70, about 50 to about 70 wt % of one or more Surfactant C compounds.

In certain exemplary embodiments, the inverting surfactant composition comprises or consists essentially of about 5 to about 95 wt % of one or more Surfactant B compounds and about 5 to about 95 wt % of a different Surfactant B compound.

In certain exemplary embodiments, the inverting surfactant composition comprises or consists essentially of about 5 to about 90 wt % of one or more Surfactant A compounds, about 5 to about 90 wt % of one or more Surfactant B compounds and about 5 to about 75 wt % of one or more Surfactant C compounds. In certain exemplary embodiments, the inverting surfactant composition comprises or consists essentially of about 5 to about 35, or about 10 to about 30, wt % of one or more Surfactant A compounds; about 25 to about 70, or about 30 to about 60, wt % of one or more Surfactant B compounds; and about 15 to about 70, about 15 to about 55, about 20 to about 50, about 35 to about 65, or about 40 to about 60, wt % of one or more Surfactant C compounds. In certain exemplary embodiments, the inverting surfactant composition comprises or consists essentially of about 15 to about 35, about 25 to about 35, about 20 to about 30, about 15 to about 25, or about 5 to about 15, wt % of one or more Surfactant A compounds; about 15 to about 45, about 35 to about 45; about 45 to about 55, about 55 to about 65, about 65 to about 75, or about 20 to about 40, wt % of one or more Surfactant B compounds; and about 15 to about 65, about 15 to about 25, about 25 to about 35, about 35 to about 45, about 45 to about 55, about 55 to about 65, or about 30 to about 50, wt % of one or more Surfactant C compounds.

In certain exemplary embodiments, the inverting surfactant composition comprises or consists essentially of about 5 to about 75 wt % of one or more Surfactant A compounds, about 5 to about 75 wt % of two or more types of Surfactant B compounds, and about 5 to about 75 wt % of one or more Surfactant C compounds. In a particular embodiment, the inverting surfactant composition comprises or consists essentially of about 25 to about 35, or about 28 to about 32, wt % of one or more Surfactant A compounds, about 25 to about 35, or about 28 to about 32, wt % of one or more Surfactant B compounds, about 25 to about 35, or about 28 to about 32, wt % of one or more Surfactant C compounds and about 5 to about 15, or about 8 to about 12, wt % of a different Surfactant B compound.

In certain exemplary embodiments, the inverting surfactant composition includes Surfactant A as the sole surfactant. In another embodiment, the inverting surfactant composition includes from about 30 to about 95 wt % of Surfactant A, from about 0 to about 50 wt % of Surfactant B, and from about 15 to about 50 wt % of Surfactant C, based on the total weight of the inverting surfactant composition. In another embodiment, the inverting surfactant composition includes from about 50 to about 70 wt % of the Surfactant A, from about 15 to about 25 wt % of Surfactant B, and from about 15 to about 25 wt % of the Surfactant C, based on the total weight of the inverting surfactant composition. In another exemplary embodiment, if the polymer includes a copolymer of acrylamide and acrylic acid monomers, the inverting surfactant composition includes at least Surfactant C.

Surfactant A

In exemplary embodiments, the emulsion or aqueous treatment fluid comprises one or more Surfactant A compounds. In exemplary embodiments, Surfactant A compounds are selected from alkyl polyethyleneglycol ether carboxylic acid compounds, alkyl polyglycol ether carboxylic acid compounds, and salts or esters thereof. As referred to herein, Surfactant A compounds include, for example, compounds comprising a $C_8$ to $C_{26}$ unsaturated or saturated alkyl chain substituted with an $(OCH_2CH_2)_yOCH_2CO_2H$ wherein the average value of y is about 2 to about 20, or about 2 to about 10. In certain exemplary embodiments, the alkyl polyethyleneglycol ether carboxylic acid compounds are anionic compounds.

In exemplary embodiments, Surfactant A compounds comprise a $C_{14}$ to $C_{22}$ unsaturated alkyl chain, for example an unsaturated alkyl chain derived from a fatty acid residue, such as oleic acid, myristoleic acid, palmitoleic acid, sapienic acid, elaidic acid, vaccenic acid, linoleic acid, α-linoleic acid, linoelaidic, arachidonic acid, eicospentanoic acid, erucic acid, docosahexaenoic acid, and the like. In exemplary embodiments, the Surfactant A is selected from the group consisting of glycolic acid ethoxylate oleyl ether, glycolic acid ethoxylate myristoleyl ether, glycolic acid ethoxylate palmitoleyl ether, glycolic acid ethoxylate sapienyl ether, glycolic acid ethoxylate elaidyl ether, glycolic acid ethoxylate vaccenyl ether, glycolic acid ethoxylated linoleyl ether, glycolic acid ethoxylated a-linoleyl ether, glycolic acid ethoxylate linoelaidyl ether, glycolic acid ethoxylate arachidonyl ether, glycolic acid ethoxylate eicospentanoyl ether, glycolic acid ethoxylate erucyl ether, and glycolic acid ethoxylated docosahexaenoyl ether.

In certain exemplary embodiments, Surfactant A is a compound or a mixture of compounds represented by the formula: $CH_3(CH_2)_xCH=CH(CH_2)_8(OCH_2CH_2)_yOCH_2CO_2H$, wherein x is 1-12 and y is 2-20.

In certain exemplary embodiments, the Surfactant A is glycolic acid ethoxylate oleyl ether. In certain exemplary embodiments, Surfactant A is the mixture of compounds represented by the formula: $CH_3(CH_2)_xCH=CH(CH_2)_8(OCH_2CH_2)_yOCH_2CO_2H$, wherein the average value for x is 5-7 and the average value for y is about 2. In exemplary embodiments, Surfactant A compounds comprise a $C_{14}$ to $C_{22}$ saturated alkyl chain, for example an saturated alkyl chain derived from a fatty acid residue, such as caprylic acid, capric acid, lauric acid, myristic acid, palmitic acid, stearic acid, arachidic acid, behenic acid, lignoceric acid, cerotic acid, and the like. In exemplary embodiments, the Surfactant A is selected from the group consisting of glycolic acid ethoxylate lauryl ether, glycolic acid ethoxylate caprylyl ether, glycolic acid ethoxylate capryl ether, glycolic acid ethoxylate myristyl ether, glycolic acid ethoxylate palmityl ether, glycolic acid ethoxylate stearyl ether, glycolic acid ethoxylated arachidyl ether, glycolic acid ethoxylated behenyl ether, glycolic acid ethoxylate lignoceryl ether, and glycolic acid ethoxylate cerotyl ether.

In certain exemplary embodiments, Surfactant A is a compound or a mixture of compounds represented by the formula: $CH_3(CH_2)_w(OCH_2CH_2)_yOCH_2CO_2H$, wherein w is 6-24 and y is 2-20.

In certain exemplary embodiments, the Surfactant A is a glycolic acid ethoxylate lauryl ether or a polyoxyethylene lauryl ether carboxylic acid or a salt thereof, such as polyoxyethylene(10) lauryl ether carboxylic acid, polyoxyethylene(3) lauryl ether carboxylic acid, polyoxyethylene(5) lauryl ether carboxylic acid, polyoxyethylene(7) lauryl ether carboxylic acid, or polyoxyethylene(4) lauryl ether carboxylic acid.

Surfactant B

In exemplary embodiments, the emulsion or aqueous treatment fluid comprises one or more Surfactant B compounds. In exemplary embodiments, Surfactant B compounds are selected from ethoxylated fatty acid compounds. As referred to herein, "ethoxylated fatty acid compounds" includes, for example, fatty acid compounds which have been reacted with ethylene oxide to form compounds containing at least 20 moles of ethoxy groups per 1 mole of the fatty acid. In certain exemplary embodiments, the ethoxylated fatty acid compounds are unsaturated, for example monounsaturated. In certain exemplary embodiments, the ethoxylated fatty acid compounds are hydroxylated or substituted with one or more hydroxyl groups. In certain exemplary embodiments, the ethoxylated fatty acid compounds are nonionic compounds. In exemplary embodiments, Surfactant B compound contains at least about 20, about 25, about 30, or about 35 units of ethoxylation.

In certain exemplary embodiments, the fatty acid is, for example, a monounsaturated hydroxyl fatty acid, such as Ricinoleic acid. Ricinoleic acid (12-hydroxy-9-cis-octadecenoic acid) is an unsaturated omega-9 fatty acid and a hydroxy acid. It is a major component of the seed oil obtained from mature Castor plant (*Ricinus communis*L., Euphorbiaceae) seeds or in *sclerotium* of ergot (*Claviceps purpurea* Tul., Clavicipitaceae). About 90% of the fatty acid content in castor oil is the triglyceride formed from ricinoleic acid.

In certain exemplary embodiments, Surfactant B is ethoxylated castor oil.

In exemplary embodiments, the Surfactant B compound is produced by the ethoxylation of fatty acid materials derived from saturated or unsaturated animal or vegetable fats, such as coconut oil, tall oil, stearic fatty acid, oleic fatty acid or adipic fatty acid.

In certain exemplary embodiments, the ethoxylated fatty acid compound is, for example, coconut fatty acid ethoxylate, lauric acid ethoxylate, oleic acid ethoxylate, or myristic acid ethoxylate.

Surfactant C

In exemplary embodiments, the emulsion or aqueous treatment fluid comprises one or more Surfactant C compounds. In exemplary embodiments, Surfactant C compounds are selected from ethoxylated alcohol compounds. As referred to herein, "ethoxylated alcohol compounds" includes, for example, alcohol compounds comprising two ethoxy or polyethoxy groups and one group selected from hydrogen, alkyl, aryl, C(=O)-alkyl or C(=O)-aryl group. In certain exemplary embodiments, the ethoxylated alcohol compounds are compounds of the formula $C_{11-15}$, $H_{23-31}O(CH_2CH_2O)_{3-40}H$.

It should be understood that any numerical range recited herein is intended to include all sub-ranges subsumed therein. For example, a range of "11-15" is intended to include all sub-ranges between and including the recited minimum value of 11 and the recited maximum value of 15. Because the disclosed numerical ranges are continuous, they include every value between the minimum and maximum values.

In exemplary embodiments, the ethoxylated alcohol compound is TERGITOL® 15-S-40 (Dow Chemical Company), an ethoxylated secondary alcohol containing 40 ethylene oxide units in the ethoxylate chain. It is the reaction product of a mixture of 11-15 carbon, linear secondary alcohols and ethylene oxide, and is believed to have the structure shown below:

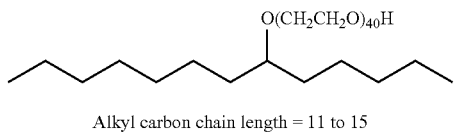

Alkyl carbon chain length = 11 to 15

Emulsions

Exemplary emulsions, for example water-in-oil emulsions or oil-external emulsions, may comprise water, a water-immiscible liquid, one or more polymers, and an inverting surfactant composition comprising one or more surfactants selected from the group consisting of Surfactant A compounds, Surfactant B compounds, and Surfactant C compounds, as described herein. In certain exemplary embodiments, the emulsions comprise water, a water-immiscible liquid, one or more polymers, and an inverting surfactant composition comprising one or more Surfactant A compounds. In certain exemplary embodiments, the emulsions comprise water, a water-immiscible liquid, one or more polymers, and an inverting surfactant composition comprising one or more Surfactant B compounds. In certain exemplary embodiments, the emulsions comprise water, a water-immiscible liquid, one or more polymers, and an inverting surfactant composition comprising one or more Surfactant C compounds. In certain exemplary embodiments, the emulsions comprise water, a water-immiscible liquid, one or more polymers, and an inverting surfactant composition comprising two or more surfactants selected from the group consisting of Surfactant A compounds, Surfactant B compounds, and Surfactant C compounds. In certain exemplary embodiments, the emulsions comprise water, a water-immiscible liquid, one or more polymers, and an inverting surfactant composition comprising three or more surfactants selected from the group consisting of Surfactant A compounds, Surfactant B compounds, and Surfactant C compounds. In certain exemplary embodiments, the emulsions comprise water, a water-immiscible liquid, one or more polymers, and an inverting surfactant composition comprising four or more surfactants selected from the group consisting of Surfactant A compounds, Surfactant B compounds, and Surfactant C compounds. The emulsion may optionally comprise inhibitors, emulsifiers, salts and/or other surfactants.

In exemplary embodiments, the emulsion comprises: water; a water-immiscible liquid; greater than about 10% by weight one or more polymers, wherein the one or more polymers comprises acrylamide and one or more monomers selected from the group consisting of acrylamido-tert-butyl sulfonic acid (ATBS), acrylic acid, and salts thereof; about 1% to about 5% by weight an inverting surfactant composition described herein. In exemplary embodiments, the emulsion comprises: water; a water-immiscible liquid; greater than about 10% by weight one or more polymers; about 1% to about 5%, about 2% to about 4%, or about 2% to 3% by weight of an inverting surfactant composition comprising one or more surfactants selected from the group consisting of Surfactant A compounds, Surfactant B compounds, and Surfactant C compounds. In exemplary embodiments, the amounts of each individual inverting surfactant included in the emulsion, when two or more exemplary inverting surfactants are used can vary as necessary, for example, each exemplary inverting surfactant can be present in an amount from about 0.1 to about 5%, about 0.15 to about 3%, or about 0.25 to about 3%, by weight, based on the total emulsion. The total amount of surfactant present in the emulsion can be easily determined by multiplying the amount of inverting surfactant present in the emulsion times the amount(s) of Surfactant A, B, and C, respectively. Accordingly, if 3% by weight of inverting surfactant composition were added to the emulsion, and the inverting surfactant composition contained 67% by weight Surfactant A, and then the amount of Surfactant A in the emulsion would be about 2.01%.

The water present in the emulsions generally includes freshwater, but saltwater or combinations with saltwater also may be used. Generally, the water used may be from any source, provided that it does not contain an excess of compounds that may adversely affect other components in the emulsion. In some embodiments, the water may be present in the emulsion in an amount in the range of from about 1% to about 50%, about 1% to about 12%, about 3% to about 50%, about 3% to about 12%, about 1% to about 5%, about 12% to about 50%, or about 30% to about 50% by weight of the emulsion. In some embodiments, the emulsion composition may have less than about 30%, about 20%, about 12%, about 10%, about 7%, about 5%, or about 3% by weight water. In some embodiments, the emulsion composition may have greater than about 1%, about 2%, about 3%, about 5%, about 7%, about 10%, about 12%, or about 20%, by weight water. In certain exemplary embodiments, the emulsion can be water-free or at least substantially water-free. In embodiments wherein the amount of water in the emulsion is kept to a very small amount, the emulsion may be in the form of a liquid dispersion polymer composition or a liquid polymer composition.

Suitable water-immiscible liquids may include, but are not limited to, water-immiscible solvents, such as paraffin hydrocarbons, naphthene hydrocarbons, aromatic hydrocarbons, olefins, oils, stabilizing surfactants and mixtures thereof. The paraffin hydrocarbons may be saturated, linear, or branched paraffin hydrocarbons. Examples of suitable aromatic hydrocarbons include, but are not limited to, toluene and xylene. In one embodiment, the water-immiscible liquid is an olefin and paraffin blend. In one embodiment, the water-immiscible liquid comprises oil and one or more emulsifiers. The water-immiscible liquid may be present in the emulsion in an amount sufficient to form a stable emulsion. In some embodiments, the water-immiscible liquid may be present in the emulsions in an amount in the range of from about 20% to about 60%, about 25% to about 55%, about 35% to about 55%, or about 20% to about 30% by weight.

In exemplary embodiments, the emulsion comprises one or more emulsifiers. Emulsifiers, among other things, in the emulsion, lower the interfacial tension between the water and the water-immiscible liquid so as to facilitate the formation of a water-in-oil polymer emulsion. In exemplary embodiments, the emulsifier is not a compound of Surfactants A, B, or C. The emulsifier should be present in an amount sufficient to provide the desired stable water-in-oil polymer emulsion. In some embodiments, the emulsifier may be present in an amount in the range of from about 0.5% to about 5% by weight of the emulsion.

The polymer may be present in the emulsion in an amount that does not undesirably impact the emulsion's stability. In exemplary embodiments, the one or more polymers may be present in an amount in the range of from about 10% to about 80%, about 10% to about 35%, about 15% to about 30%, or about 20% to about 30%, about 39% to about 80%, or about 40% to about 60%, or about 45% to about 55%, by weight of the emulsion. In exemplary embodiments, the emulsion may comprise greater than about 35%, about 39%, 40%, 41%, 42%, 43%, 44%, 45%, 46%, 47%, 48%, 49%, 50%, 51%, 52%, 53%, 54%, 55%, 56%, 57%, 58%, 59% or about 60% or higher, by weight polymer. In exemplary embodiments, the emulsion may comprise less than about 35%, or about 30%, or less, by weight polymer.

In certain exemplary embodiments, the emulsions may further comprise one or more organic or inorganic salts. In certain exemplary embodiments, the emulsions comprise at least about 0.5% of one or more organic or inorganic salts. In exemplary embodiments, the emulsions comprise one or more organic or inorganic salts in an amount about 0.5% to about the point of saturation in the emulsion. Representative organic or inorganic salts include but are not limited to sodium chloride, sodium sulfate, sodium bromide, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate, sodium salts, lithium salts, potassium salts, magnesium salts, aluminum salts, ammonium salts, phosphate salts, sulfate salts, chloride salts, fluoride salts, citrate salts, acetate salts, tartrate salts, hydrogenphosphate salts, water soluble inorganic salts, other inorganic salts, other organic salts and mixtures thereof. In exemplary embodiments, the one or more organic or inorganic salts includes ammonium chloride.

In some embodiments, emulsion polymerization may be used to prepare exemplary emulsions. Suitable emulsion polymerization techniques may have a variety of different initiation temperatures depending on, among other things, the amount and type of initiator used, the amount and type of monomers used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 30° C. to about 70° C., or from about 40° C. to about 60° C.

In exemplary embodiments, the one or more polymers are in the form of a emulsion, such as a polyacrylamide emulsion. In exemplary embodiments, the emulsion comprises a hydrophilic polymer contained within water droplets that are dispersed in a continuous oil phase. In exemplary embodiments, the one or more polymers are in the form of an aqueous dispersion, for example an aqueous polymer dispersion prepared by solution polymerization. Methods for the preparation of exemplary aqueous polymer dispersions are well known in the art, for example as described in U.S. Pat. No. 5,200,448, the disclosure of which is incorporated by reference herein in its entirety.

In exemplary embodiments, any suitable emulsion polymerization method may be employed in the preparation of the one or more polymers described here. Descriptions of the steps of an exemplary emulsion preparation provided herein, but are not intended to be limiting with respect to the methods for preparing the exemplary one or more polymers.

A preliminary emulsion is made by homogenizing oil and aqueous phases. The oil phase of the emulsion, which generally comprises from about 5% to about 35% by weight of the total emulsion, is comprised of one or more inert hydrophobic liquids. Preferably, the oil phase comprises about 20% to about 30% by weight of the total emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons, such as perchloroethylene, and the like.

The oil phase may contain one or more primary or emulsifying surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well-known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier may be utilized which will permit the formation of the initial emulsion and stabilize the emulsion during the polymerization reaction.

These primary surfactants are used alone or in mixtures and are utilized in amounts of not greater than about 5%, about 4%, about 3%, about 2% or about 1% by weight of the total emulsion.

The aqueous phase generally comprises about 95 to 65% by weight of the initial emulsion. Preferably, it comprises about 80 to 70% thereof. In addition to water, the aqueous phase contains the monomers being polymerized, generally in an amount of less than about 50%, about 15 to about 40%, or about 22 to about 35%, by weight of the total emulsion, and generally chain transfer agents, initiators and sequesterants. Alternatively, the chain transfer agents, initiators and sequesterants may be added to the system after the preliminary emulsion has been prepared. The initiator may also be added continuously during the polymerization to control the rate of polymerization depending upon the particular monomers used and their reactivities.

Alternatively, the initiator may be present in either the oil or the aqueous phase with the monomers being added either continuously or incrementally thereafter. All of these variations are well known in the art.

The monomers suitable for use in the preparation of the exemplary polymers are described herein.

Any conventional chain transfer agent may be employed, such as propylene glycol, isopropanol, 2-mercaptoethanol, sodium hypophosphite, dodecyl mercaptan and thioglycolic acid. The chain transfer agent is generally present in an amount of about 0.1 to 10 percent by weight of the total emulsion, though more may be used.

The initiator may be any free radical producing material well known in the art. The preferred free radical initiators are the redox-type and the azo-type polymerization initiators and they are generally used in an amount of about 0.0005 to 0.5 percent by weight of the total emulsion. Radiation may also be used to initiate the reaction.

Any conventional sequesterant may also be present in the aqueous phase, such as ethylenediaminetetraacetic acid or pentasodium diethylenetriamine pentaacetate. The sequesterant is generally present in an amount of about 0.01% to 2% by weight of the total emulsion, though more may be utilized.

Following preparation of the preliminary emulsion, polymerization of the monomers is commenced at a temperature sufficiently high to break down the initiator to produce the desired free radicals. Generally a suitable temperature is about −20° C. to about 200° C., or about 20° C. to 100° C.

Preferably the polymerization is run at a pH of about 2 to 12 and a suitable amount of base or acid may be added to the preliminary emulsion to achieve the desired pH. The polymerization is usually completed in about an hour or two to several days, depending upon the monomers employed and other reaction variables. It is generally carried out at atmospheric pressure, but higher pressures are advantageously used when volatile ingredients are involved.

In certain exemplary embodiments, once polymerization is complete, the amount of water in the emulsion may be reduced or removed as desired. For example, the water can be removed to a level of less than about 12%, or less than about 10%, or less than about 7%, or less than about 5%, or less than about 3% by weight. In exemplary embodiments, the removal of water is carried out by any suitable means, for example, at reduced pressure, e.g. at a pressure of about 0.00 to about 0.5 bars, or about 0.05 to about 0.25 bars. The temperature for water removal steps may typically be from about 50° C. to about 150° C., although techniques which remove water at higher temperatures may be used.

Following completion of the polymerization, the pH of the emulsion may be adjusted as desired. For an anionic polymer emulsion, the pH is generally about 4 to 10. A breaker or inverting surfactant, or blend of inverting surfactants, is generally added to yield a single package of final product. In exemplary embodiments, an inverting surfactant composition, as described herein, is added to the polymer emulsion. Other suitable breaker or inverting surfactants may be used in combination with the exemplary polymer and exemplary inverting surfactant composition in the emulsion. As described herein, the total amount of inverting surfactants present in the emulsion is about 1% to about 5% by weight, based on the total emulsion.

Once prepared, the emulsions of the present embodiments may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, the disclosures of which are incorporated herein by reference. The emulsion of the present embodiments may also be concentrated in any suitable manner, such as is disclosed in U.S. Pat. No. 4,021,399, the disclosures of which is incorporated herein by reference.

A variety of different mixtures may be used to prepare an emulsion for use in the present embodiments. Suitable mixtures may include acrylamide, other monomers, water, a water-immiscible liquid, an initiator, and an emulsifier. Generally the one or more ethoxylated alcohol compounds can be combined with one or more inverting surfactants to form the inverting surfactant composition. The inverting surfactant composition can be added to the polymer emulsion to form a mixture. Optionally, the mixture may further comprise a base (e.g., sodium hydroxide) to neutralize the monomers in acid form such that the salt of the monomer is not formed, a complexing agent to allow the gradual release of monomers in the polymerization reaction, an activator to initiate polymerization at a lower temperature, and an inverter. Those of ordinary skill in the art, with the benefit of this disclosure, will know the amount and type of components to include in the mixture based on a variety of factors, including the desired molecular weight and composition of the polymer and the desired initiation temperature.

Generally, the exemplary emulsions are particularly suitable for use in brine. The exemplary emulsions may be used in a range of temperatures, for example between about 5° C. and about 99° C., or between about 50° C. and about 95° C.

In certain exemplary embodiments, the emulsion may be used in combination with a proppant.

Treatment Fluids

The treatment fluid, for example an aqueous treatment fluid, containing the emulsions described herein, can be used in any well treatment fluid, including but not limited to stimulation, production and completion operations. For example, the well treatment fluid can be used for hydraulic fracturing applications or in an application where friction reduction is desired. Conventional fracturing fluids typically contain natural or synthetic water soluble polymers, which are well known in the art. Water soluble polymers viscosify the aqueous liquids at relatively low concentrations due to their high molecular weight.

In an exemplary embodiment, the treatment fluid comprises water and an exemplary emulsion described herein. The treatment fluids may be prepared by mixing an exemplary emulsion with water. The exemplary emulsion is a water-in-oil emulsion that undergoes rapid inversion upon addition to water. The speed at which the emulsion undergoes inversion can be measured by the amount of time required to substantially reach the maximum friction reduction, which typically is plotted as a function of time as in the Figures herein. Throughout this description, the expression "complete conversion" denotes the time to reach about 90% friction reduction, and is represented by $t_{90}$. Those skilled in the art are capable of determining the value of $t_{90}$ of a friction reducing emulsion that undergoes inversion in aqueous solutions. Typically, the inversion is complete (e.g., $t_{90}$) within about 35 seconds. More preferably, the inversion is complete in about 5 to 20 seconds.

The additional water that is mixed with the emulsion to form the treatment fluid may be freshwater, saltwater (e.g. water containing one or more salts dissolved therein), brine (e.g. produced from subterranean formations, or recycled water from the treatment process that contains additional salts), seawater, or combinations thereof. Generally, the water used may be from any source, provided that it does not contain an excess of compounds that may adversely affect other components in the aqueous treatment fluid or the formation itself. In certain exemplary embodiments, the water is brine with a total dissolved solids content (TDS) of about 40,000 to about 300,000 ppm, or about 100,000 to about 260,000 ppm. In certain exemplary embodiments, the total divalent cationic species content of the brine is in the range of about 0 to about 100,000 ppm, or about 1,000 to about 50,000 ppm.

Total dissolved solids ("TDS") refers to the sum of all minerals, metals, cations, and anions dissolved in water. As most of the dissolved solids are typically salts, the amount of salt in water is often described by the concentration of total dissolved solids in the water.

Dissolved solids in typical freshwater samples include soluble salts that yield ions such as sodium (Nat), calcium ($Ca^{2+}$), magnesium ($Mg^{2+}$), bicarbonate ($HCO_3^-$), sulfate ($SO_4^{2-}$), or chloride ($Cl^-$). Water that contains significant amounts of dissolved salts is sometimes broadly called saline water or brine, and is expressed as the amount (by weight) of TDS in water in mg/l. On average, seawater in the world's oceans has a salinity of about 3.5%, or 35 parts per thousand. More than 70 elements are dissolved in seawater, but only six elements make up greater than 99% by weight.

Total dissolved solids can be determined by evaporating a pre-filtered sample to dryness, and then finding the mass of the dry residue per liter of sample. A second method uses a Vernier Conductivity Probe to determine the ability of the dissolved salts in an unfiltered sample to conduct an electrical current. The conductivity is then converted to TDS. Either of these methods yields a TDS value, typically reported in units of mg/L.

Broadly speaking, either "saline water" or "brine" is often understood to be water containing any substantial concentration of dissolved inorganic salts, regardless of the particular concentration. The terms "saline water," "brine," and other terms regarding water may sometimes be used to refer to more precise ranges of concentrations of TDS. Although the specific ranges of TDS for various types of water are not universally agreed upon, various sources have used the definitions and ranges shown in the table below. As used herein, unless the context otherwise suggests, the terms for classifying water based on concentration of TDS will generally be understood as defined in the table below.

Classification of Water Based on TDS Concentration

| WATER | PPM | LG/GAL (US) |
|---|---|---|
| Potable | <250 | <0.0021 |
| Freshwater | <1,000 | <0.0083 |
| Brackish | 1,000-15,000 | 0.0083-0.0417 |
| Saline | 15,000-30,000 | 0.0417-0.1251 |
| Seawater | 30,000-40,000 | 0.1251-0.3338 |
| Brine | >40,000 | >0.3338 |

In exemplary embodiments, the polymer may be present in the treatment fluid in an amount of about 0.01% to about 1% by weight of the treatment fluid.

In these applications, the treatment fluid, can be configured as a gelled fluid, such as a linear gel, a crosslinked gel, or a foamed gel fluid; acidic fluids, water and potassium chloride treatments, and the like. The treatment fluid is injected at a pressure effective to create one or more fractures in the subterranean formation. Depending on the type of well treatment fluid utilized, various additives may also be added to the fracturing fluid to change the physical properties of the fluid or to serve a certain beneficial function. In one embodiment, the fluid does not contain a sufficient amount of water-soluble polymer to form a gel.

In exemplary embodiments, the treatment fluid comprises a proppant.

In various exemplary embodiments, the proppants may be finely sized sand. Generally sand is referred to by the size of mesh which the sand will pass through, and the size of mesh which the sand will not pass through. Typically, a 20-40 mesh sand is used but other sizes, such as 40-50 or 40-60, may be utilized. Sand is also characterized by the "roundness" of the sand particles. Generally rounder sand is utilized in order to create more uniform void spaces between the particles and therefore better permeability within the propped fracture. Fracturing fluids also contain, for example, viscosifiers to slow the rate at which sand will separate from the fluids and permit the sand to be carried farther into the fractures.

In other exemplary embodiments, other types of proppants may be used. For example, the proppant may be a ceramic proppant. The proppant may be a coated proppant, such as proppants with coatings with low coefficients of friction in order to reduce erosion caused by the fracturing fluid. Coatings also may be used to make the sand particles more round. Examples of such coatings include antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, or tungsten disulfide or zinc oxide. Ceramic proppants are suggested, for example, in U.S. Pat. No. 4,555,493 to Watson et al., and low density ceramic proppants are suggested in U.S. Pat. No. 8,420,578 to Usova et al.

Fracturing fluids may also contain other components as necessary or desired. For example, the fracturing fluids may contain acids for breaking the thickening polymers, salts such as calcium chlorides to increase the density of the fluids, corrosion inhibitors or other additives in the fracturing fluids.

Also, fluid loss agents may be added to partially seal off the more porous sections of the formation so that the fracturing occurs in the less porous strata. Other oilfield additives that may be added to the fracturing fluid include emulsion breakers, antifoams, scale inhibitors, $H_2S$ and or $O_2$ scavengers, biocides, crosslinking agents, surface tension reducers, buffers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors, and acids. For example, an acid may be included in the aqueous treatment fluids, among other things, for a matrix or fracture acidizing treatment. In fracturing embodiments, propping agent may be included in the aqueous treatment fluids to prevent the fracture from closing when the hydraulic pressure is released. In a particular embodiment, the treatment fluid further comprises a biocide.

Methods of Use

The emulsions and treatment fluids of the present embodiments may be used in any subterranean treatment. Such subterranean treatments include, but are not limited to, drilling operations, stimulation treatments, and completion operations. Those of ordinary skill in the art, with the benefit of this disclosure, will be able to recognize a suitable subterranean treatment. In exemplary embodiments, the emulsion comprises: water; a water-immiscible liquid; about 10% to about 80% by weight of one or more polymers, wherein the one or more polymers comprises acrylamide and one or more monomers selected from the group consisting of acrylamido-tert-butyl sulfonic acid (ATBS) and salts thereof; and about 1% to about 5% by weight of an exemplary inverting surfactant composition described herein.

In exemplary embodiments, the methods may further comprise preparing the treatment fluid, or aqueous treatment fluid. Preparing the treatment fluid may comprise providing an emulsion as described herein, and combining the emulsion with water to form the treatment fluid.

In exemplary embodiments, a method of treating a portion of a subterranean formation comprises: providing a treatment fluid of the present embodiments comprising an emulsion as described herein, and introducing the treatment fluid into the portion of the subterranean formation. In some embodiments, the treatment fluid may be introduced into the portion of the subterranean formation at a rate and pressure sufficient to create or enhance one or more fractures in the portion of the subterranean formation. The portion of the subterranean formation that the treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated. In exemplary embodiments, the treatment fluid may be introduced into the portion of the subterranean formation at a rate (in barrels per minute) of about 30 bpm to about 250 bpm, or about 50 bpm to about 175 bpm.

In exemplary embodiments, a method of treating a subterranean formation comprises: providing a treatment fluid comprising an exemplary emulsion described herein; and introducing the treatment fluid into a subterranean formation.

In exemplary embodiments, a method of fracturing a subterranean formation comprises: (a) providing an exemplary emulsion as described herein; (b) mixing the emulsion with additional water to form a treatment fluid, wherein the one or more polymers are present in the treatment fluid in an amount of about 0.01% to about 1% by weight of the treatment fluid; and (c) introducing the treatment fluid into a subterranean formation at or above a pressure sufficient to create one or more fractures in the subterranean formation.

In exemplary embodiments, the treatment fluid comprises brine. In exemplary embodiments, the exemplary emulsion or treatment fluid comprises proppant. In certain exemplary embodiments, a propping agent (or proppant) such as sand or other hard material is added to the exemplary emulsions or treatment fluids which serves to keep the fractures open after the fracturing operation.

The fractures produced may be propped using proppants, or the fracturing fluid may include reactants to react with the surface of the rock faces to result in permeability along the fracture. The fractures may be utilized in vertical or horizontal wells, to produce natural gas, light tight oil, or for injection of fluids into the formation.

Fracturing, or fracing, or fracking, of formations is generally accomplished by injection of a slurry of fracturing fluid and proppant into the formation at pressures sufficiently great to exceed the tensile strength of the formation and cause the formation to separate at the point of the perforations. Formations will generally have a direction where the formation is under the least amount of stress, and the fracture will initially propagate in a plane perpendicular to the direction of such least stress. In deep formations, the weight of the overburden will generally assure that the direction of minimal stress is a horizontal direction. It is generally the goal to provide horizontal wellbores in such formation in the direction of the minimal formation stress so that fractures from the wellbore will tend to be perpendicular to the wellbore. This allows access to the maximum possible volume of formation from a horizontal wellbore of a limited length.

Any method for hydraulic fracturing of formations known in the art may utilize the exemplary emulsions and treatment fluids.

Propagation of fractures is typically halted or at least inhibited by interfaces between formations because the force exerted at the tip of the fracture can be dispersed at the interface of the formations. Larger fractures may therefore tend to have more rectangular shapes rather than disk shapes as the dimensions of the fracture exceed the height of the formation, and the fracture therefore grows laterally rather than continuing to grow vertically.

In exemplary embodiments, methods for improving friction reduction properties of a treatment fluid, include: (i) providing an exemplary emulsion as described herein; and (ii) inverting the emulsion in an aqueous treatment fluid comprising brine. In certain embodiments, the resultant treatment fluid has an improvement in friction reduction when compared to a similar treatment fluid in which the inverted emulsion is other than an exemplary inverting surfactant composition as described herein. For example, inverting surfactant compositions including ≥50 wt % surfactant A showed in improvement Max FR within the range of from about 2 to about 25%, when compared to inverting surfactant compositions having ≤50 wt % surfactant A, or from about 4 to about 15%, or from about 5 to about 10%, or any value therebetween. Inverting surfactant compositions having ≥50 wt % surfactant A showed in improvement in $t_{90}$ within the range of from about 40 to about 80%, when compared to inverting surfactant compositions having ≤50 wt % surfactant A, or from about 45 to about 65%, or from about 50 to about 60%, or any value therebetween. These improvements were entirely unexpected from the known art, such as WO 2018/045282 (the disclosure of which is incorporated by reference herein in its entirety), in which inverting surfactant compositions containing more than 50% by weight of Surfactant A (referred to as "Surfactant B" in the PCT publication), showed inferior Max FR and $t_{90}$, in high brine, and regardless of whether a cationic polyacrylamide (CPAM) or anionic polyacrylamide (EPAM) polymer were used in the emulsion.

In certain embodiments, the emulsion further comprises an emulsifier. In one embodiment, the improved friction reduction property is the percent friction reduction of the treatment fluid. In one embodiment, the improved friction reduction property is the time to achieve maximum friction reduction, or a desired percentage of the maximum friction reduction, for example 90%. In certain exemplary embodiments, the methods described herein provide an energy savings over methods which utilize a similar treatment fluid in which the inverted emulsion is other than an exemplary inverting surfactant composition as described herein.

In exemplary embodiments, a method for improving friction reduction properties of a treatment fluid comprises: (i) providing an emulsion comprising: water; a water-immiscible liquid; one or more polymers; and an inverting surfactant composition comprising two or more surfactants selected from the group consisting of Surfactant A compounds, Surfactant B compounds, and Surfactant C compounds; and (ii) inverting the emulsion in an aqueous treatment fluid comprising brine; wherein the resultant treatment fluid has an improvement in friction reduction, when compared to a similar treatment fluid in which the emulsion that does not contain an inverting surfactant composition comprising two or more surfactants selected from the group consisting of Surfactant A compounds, Surfactant B compounds, and Surfactant C compounds.

In exemplary embodiments, a method for improving friction reduction properties of a treatment fluid comprises: (i) providing an emulsion comprising: water; a water-immiscible liquid; one or more polymers; and an inverting surfactant composition comprising more than about 50% by weight of Surfactant A; and (ii) inverting the emulsion in an aqueous treatment fluid comprising brine; wherein the resultant treatment fluid has an improvement in friction reduction, when compared to a similar treatment fluid in which the emulsion that does not contain an inverting surfactant composition comprising two or more surfactants comprising Surfactant B1 and Surfactant B2 compounds.

In exemplary embodiments, emulsions that include polymers having at least acrylamide (AMD) and acrylamido-tert-butyl sulfonic acid (ATBS) monomers showed improved Max FR, when compared to copolymers of AMD and acrylic acid (AA) of from about 25 to about 75%, or from about 30 to about 70%, or from about 34 to about 65%, or any value therebetween, when used in various brine solutions. Polymers comprising at least AMD and ATBS showed improved $t_{90}$, when compared to copolymers of AMD and AA of from about 60 to about 100%, or from about 60 to about 95%, or from about 63 to about 92%, or any value therebetween. The improvement in friction reduction and $t_{90}$ is even more pronounced in high brine (Brine D), where polymers comprising at least AMD and ATBS monomers had improved Max FR, when compared to copolymers of AMD and AA, of from about 50 to about 75%, or from about 51 to about 65%, and had improved $t_{90}$ of from about 75 to about 95%, or from about 80 to about 90%, or any value therebetween.

The inverting surfactant compositions, emulsions and treatment fluids of the present embodiments may have various uses, for example in crude oil development and production from oil bearing formations that can include primary, secondary or tertiary (enhanced) recovery. Chemical techniques, including for example injecting surfactants (surfactant flooding) to reduce interfacial tension that prevents or inhibits oil droplets from moving through a reservoir or injecting polymers that allow the oil present to more easily mobilize through a formation, can be used before, during or after implementing primary and/or secondary recovery techniques. Such techniques can also be used for enhanced oil recovery, or to complement other enhanced oil recovery techniques.

The inverting surfactant compositions, emulsions and treatment fluids of the present embodiments may be used in any oil recovery technique, for example an oil recovery technique where the reduction of friction or interfacial tension is desired, or where mobilization of oil is desired. In exemplary embodiments, a method comprising using an inverting surfactant composition, emulsion or treatment fluid as described herein may be utilized for oil recovery, including but not limited to enhanced oil recovery. In exemplary embodiments, the method comprises providing a treatment fluid comprising an emulsion comprising one or more polymers and an exemplary inverting surfactant composition described herein; and introducing the treatment fluid into a subterranean formation; and recovering hydrocarbons from the subterranean formation. In exemplary embodiments, the method comprises providing an emulsion comprising one or more polymers and an exemplary inverting surfactant composition described herein; and introducing the emulsion into a subterranean formation; and recovering hydrocarbons from the subterranean formation.

In certain exemplary embodiments, the methods further comprise adding a proppant.

The following examples are presented for illustrative purposes only, and are not intended to be limiting.

EXAMPLES

In these examples, the impact of exemplary inverting surfactant compositions on inversion properties of certain polymer emulsion compositions is evaluated by measuring the friction reduction performance of polymer emulsions.

I. Polymer Emulsions

A polyacrylamide emulsion (EPAM2) comprising the anionic co-polymer acrylamide/sodium acrylamido-tert-butyl sulfonate (85/15 mole %) was prepared by standard emulsion procedures, for example, by addition of the monomers acrylamide and sodium acrylamido-tert-butyl sulfonate (Na-ATBS) to a surfactant containing oil phase with homogenization. The resulting monomer emulsion was polymerized using free radical polymerization chemistry in the presence of adequate agitation and cooling, which resulted in a high molecular weight anionic polymer emulsion. Similarly, a polyacrylamide emulsion (EPAM1) comprising the anionic co-polymer acrylamide/acrylic acid (85/15 mole %) was prepared, and a polyacrylamide emulsion (EPAM3) comprising the anionic ter-polymer acrylamide/sodium acrylamido-tert-butyl sulfonate/acrylic acid (85/7.5/7.5 mole %) was prepared.

In Example 1 below, the friction reduction performance of EPAM2 in combination with various inverting surfactant compositions were determined. In Example 2 below, the friction reduction performance of EPAM1, EPAM2, and EPAM3 was determined for the base emulsion in the presence of the same inverting surfactant system in various Brine solutions.

II. Surfactants

In the examples below, Surfactant A is ether carboxylic acid, Surfactant B is ethoxylated castor oil, and Surfactant C is a secondary alcohol ethoxylate.

III. Friction Loop Testing

The friction loop is a laboratory instrument designed to simulate well fracturing flow conditions. Fracturing in the field often requires pumping over 50 barrels per minute through a ~4.5" bore which results in a highly turbulent flow (Reynolds number: 500,000 to 5,000,000). Although it is not possible to achieve this kind of flow in the lab, the friction loop designed simulates the field conditions to the maximum known extent (Reynolds number: 120,000). The data generated by this laboratory scale friction loop is accurate and widely accepted by the industry. The main components of the friction loop are: pump, magnetic flow meter and a differential pressure transmitter to create and monitor necessary conditions. All pipes and other components are constructed using stainless steel 316L/304L material.

To test the friction reduction property of the polymer, the friction loop reservoir was filled with 20 L of 250K brine (see Table 1 for composition of brine). This brine was then re-circulated through the friction loop at a flow rate of 24 gallons per minute across a five-foot section of half-inch diameter pipe (required to generate the above mentioned Reynolds number). The baseline pressure drop was measured. The exemplary emulsion containing polymer was now added (at a measured concentration of 0.5 gallons of polymer per thousand gallons of brine or 0.5 GPTG) to the recirculating brine solution, where it inverted and dissolved. The degree of friction reduction (% FRt) at a given time 't' was calculated from the initial pressure drop $\Delta P_i$ and the pressure drop at time t, $\Delta P_t$ using the equation:

$$\% FR_t = \frac{\Delta P_t - \Delta P_i}{\Delta P_i} \times 100$$

Example 1

An anionic emulsion with 15 mol % of Na-ATBS and 85 mol % of acrylamide was prepared according to standard emulsion procedure without any inverting surfactants. This base emulsion was used to prepare Sample 1 through 10, which included the inverting surfactants as shown in Table 1. The performance parameters of friction reduction, which include the Max FR % (maximum friction reduction) and, $t_{90}$ (time to 90% friction reduction, a simple measure of inversion rate) were measured at a dosage of 0.5 gpt and at 77° F.±3° F. in Brine D, which has a TDS of 225,000 ppm. The results of the friction reduction experiments are provided in Table 1, as well as in FIGS. 1, and 2.

TABLE 1

Friction Reduction Performance of Polymer Emulsions with Exemplary Inverting Surfactant Compositions at 0.5 gpt in Brine D.

| Name | Surfactant A | Surfactant B | Surfactant C | Surf. % | Max FR | t90 |
|---|---|---|---|---|---|---|
| Sample 1 | 17* | 17 | 67 | 3 | 51% | 49 s |
| Sample 2 | 33 | 33 | 33 | 3 | 59% | 31 s |
| Sample 3 | 0 | 0 | 100 | 3 | 54% | 133 s |

TABLE 1-continued

Friction Reduction Performance of Polymer Emulsions with Exemplary
Inverting Surfactant Compositions at 0.5 gpt in Brine D.

| Name | Surfactant A | Surfactant B | Surfactant C | Surf. % | Max FR | t90 |
|---|---|---|---|---|---|---|
| Sample 4 | 0 | 50 | 50 | 3 | x | x |
| Sample 5 | 100 | 0 | 0 | 3 | 59% | 19 s |
| Sample 6 | 67 | 17 | 17 | 3 | 63% | 21 s |
| Sample 7 | 50 | 50 | 0 | 3 | 61% | 21 s |
| Sample 8 | 0 | 100 | 0 | 3 | x | x |
| Sample 9 | 17 | 67 | 17 | 3 | 57% | 19 s |
| Sample 10 | 50 | 0 | 50 | 3 | 52% | 51 s |

*Percentages are based solely on the inverting surfactant composition, not the emulsion.

TABLE 2

Values of Table 1, Represented in Percent
Weight Based on Weight of the Emulsion.

| Name | Surfactant A | Surfactant B | Surfactant C | Max FR | t90 |
|---|---|---|---|---|---|
| Sample 1 | 0.51 | 0.51 | 2.01 | 51% | 49s |
| Sample 2 | 0.99 | 0.99 | 0.99 | 59% | 31s |
| Sample 3 | 0 | 0 | 3 | 54% | 133s |
| Sample 4 | 0 | 1.5 | 1.5 | x | x |
| Sample 5 | 3 | 0 | 0 | 59% | 19s |
| Sample 6 | 2.01 | 0.51 | 0.51 | 63% | 21s |
| Sample 7 | 1.5 | 1.5 | 0 | 61% | 21s |
| Sample 8 | 0 | 3 | 0 | x | x |
| Sample 9 | 0.51 | 2.01 | 0.51 | 57% | 19s |
| Sample 10 | 1.5 | 0 | 1.5 | 52% | 51s |

As can be seen from Tables 1 and 2, the highest value of max.FR % and the fastest inversion time ($t_{90}$) was obtained with a combination of three surfactants as shown in Sample 6. Samples 4, and 8 could not be evaluated because they became gels when the respective surfactants were added. Sample 5 with just surfactant A also shows very good performance. But, the highest reduction in friction was achieved with a combination of Surfactant A, B, and C.

Figure 2:
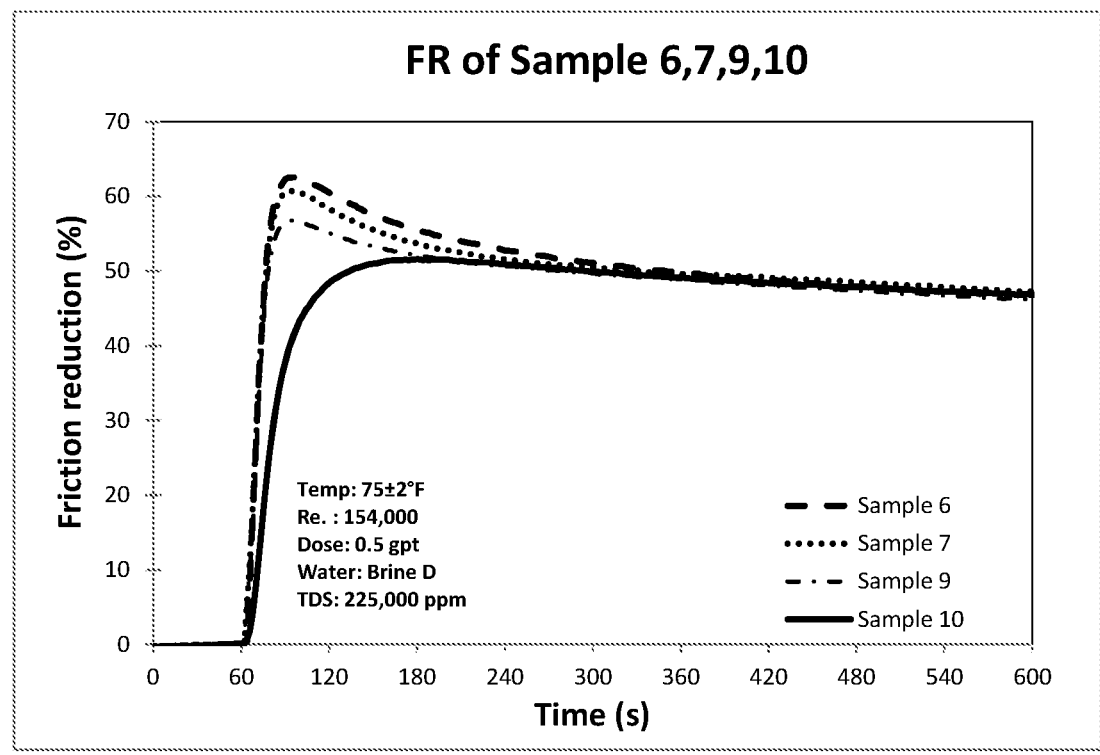
FIG. 2 Friction Reduction performance of Example 1, samples 6, 7, 9, and 10 in Brine D at 0.5 gpt.

As seen in FIG. 1, Sample 5 appears to be the best performing, which only has Surfactant A in the emulsion. Sample 3, which has only Surfactant C appears to be the worst performing emulsion. As seen in FIG. 2, Sample 6 appears to be the best performing, which has Surfactant A, B, and C in the emulsion. Sample 10, which has only Surfactant A and C appears to be the worst performing emulsion. From FIGS. 1 and 2, it can be concluded that a combination of three surfactants provides the best friction reduction performance and the fastest inversion.

Surfactants with ≥50 wt % surfactant A (average of Samples 5, 6, 7, and 10) showed in improvement Max FR within the range of from about 2 to about 25%, when compared to surfactants having ≤50 wt % surfactant A (average of Samples 1, 2, 3, and 9), or from about 4 to about 15%, or from about 5 to about 10%, or any value therebetween. Surfactants with ≥50 wt % surfactant A showed in improvement in $t_{90}$ within the range of from about 40 to about 80%, when compared to surfactants having ≤50 wt % surfactant A, or from about 45 to about 65%, or from about 50 to about 60%, or any value therebetween.

Example 2

Figure 3:
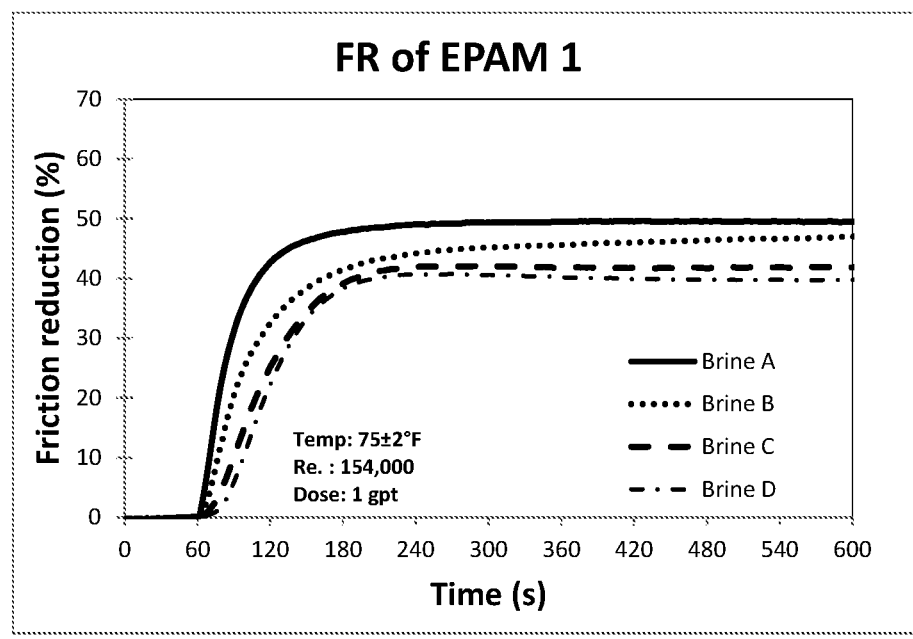
FIG. 3 shows the Friction Reduction performance of EPAM 1 from Example 2, in Brines A, B, C, and D at 1 gpt.

An anionic polyacrylamide emulsion with 15 mol % AA and 85 mol % AMD with an inverting surfactant composition comprising 60 wt % Surfactant A, 20 wt % Surfactant B, and 20 wt % Surfactant C (60-20-20 surfactant composition) was prepared. This is referred to as EPAM 1 in Table 3. EPAM 1 was tested for FR in Brine A, Brine B, Brine C and Brine D, whose composition is shown in Table 2 below. The results are as shown in FIG. 3.

Figure 4:
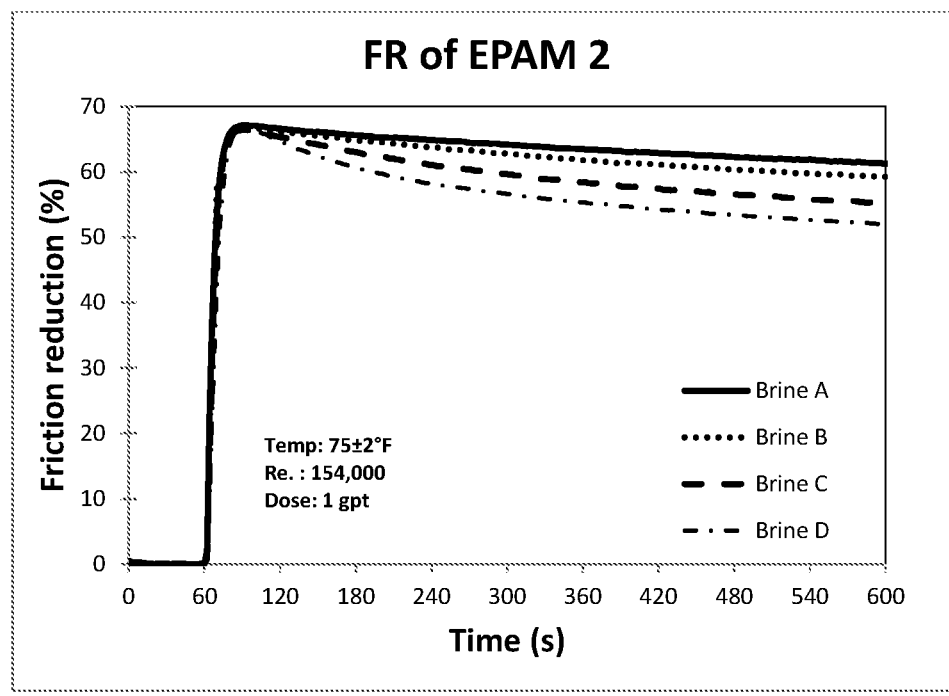
FIG. 4 shows the Friction Reduction performance of EPAM 2 from Example 2, in Brines A, B, C, and D at 1 gpt.

An anionic polyacrylamide emulsion with 15 mol % Na-ATBS and 85 mol % AMD with the 60-20-20 surfactant composition was prepared using standard procedure. This is referred to as EPAM 2. The FR in Brines A-D was tested and the performance parameters of friction reduction, which include the Max FR % (maximum friction reduction) and, $t_{90}$ (time to 90% friction reduction, a simple measure of inversion rate) was measured at a dosage of 1 gpt and at 75° F.±3° F. in various brines. The results of the friction reduction experiments are provided in Table 3 and illustrated in FIG. 4.

Figure 5:
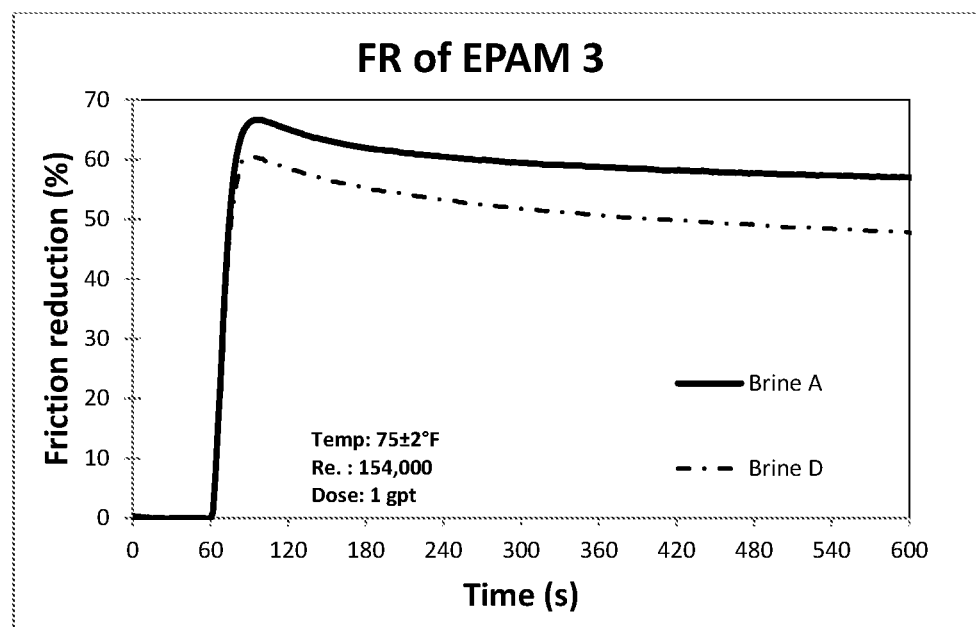
FIG. 5 shows the Friction Reduction performance of EPAM 3 from Example 2, in Brines A, and D at 1 gpt.

An anionic ter-polymer emulsion with 7.5 mol % Na-ATBS, 7.5 mol % AA, and 85 mol % AMD with the 60-20-20 surfactant composition was prepared using standard procedure. This is referred to as EPAM 3. The FR in Brines A and Brine D was tested and the performance parameters of friction reduction, which include the Max FR % (maximum friction reduction) and, $t_{90}$ (time to 90% friction reduction, a simple measure of inversion rate) was measured at a dosage of 1 gpt and at 75° F.±3° F. in various brines. The results of the friction reduction experiments are provided in Table 3 and illustrated in FIG. 5.

TABLE 2

Brine composition used for FR testing indicating
the ions and TDS of each brine

| | ppm | | | |
|---|---|---|---|---|
| Ion | Brine A | Brine B | Brine C | Brine D |
| Na+ | 13,532 | 27,064 | 54,128 | 67,660 |
| Mg++ | 263 | 526 | 1,052 | 1,315 |
| Ca++ | 3,435 | 6,869 | 13,738 | 17,173 |
| Cl− | 27,712 | 55,424 | 110,847 | 138,559 |
| TDS | 44,941 | 89,883 | 179,766 | 224,707 |

The total dissolved solids in Brines A-D range from 45,000 ppm to 225,000 ppm.

TABLE 3

Friction Reduction performance comparison of polymer emulsions
with anionic monomers, AA vs. ATBS in various brines at 1 gpt.

| Name | Monomers | Brine | Max FR | t90 |
|---|---|---|---|---|
| EPAM 1 | AA/AMD | Brine A | 50% | 73 |
| | | Brine B | 47% | 133 |
| | | Brine C | 42% | 109 |
| | | Brine D | 41% | 107 |

TABLE 3-continued

Friction Reduction performance comparison of polymer emulsions with anionic monomers, AA vs. ATBS in various brines at 1 gpt.

| Name | Monomers | Brine | Max FR | $t_{90}$ |
|---|---|---|---|---|
| EPAM 2 | ATBS/AMD | Brine A | 67% | 13s |
| | | Brine B | 67% | 13s |
| | | Brine C | 67% | 13s |
| | | Brine D | 67% | 17s |
| EPAM 3 | AA/ATBS/AMD | Brine A | 67% | 27s |
| | | Brine D | 60% | 19s |

As can be seen from Table 3, EPAM 1 which did not include the ATBS co-monomer, did not perform as well as EPAM 2 across all brines. The max.FR was not as high as EPAM 2 and the $t_{90}$ was much longer for EPAM 1 when compared to EPAM 2.

There was consistent performance throughout the brine spectrum with the emulsion containing co-polymers AMD and ATBS (EPAM 2). This was a significant improvement when compared against EPAM 1, which did not include the ATBS co-monomer.

The FR performance in lower TDS brine was excellent compared to the higher TDS brine for EPAM3. The FR performance of EPAM 3 was better than EPAM 1, but not when compared to EPAM 2. The presence of ATBS is particularly preferred to achieve good friction reduction in higher TDS brines.

As shown in Table 3 above, polymers comprising at least AMD and ATBS monomers showed improved Max FR, when compared to copolymers of AMD and AA of from about 25 to about 75%, or from about 30 to about 70%, or from about 34 to about 65%, or any value therebetween, when used in various Brine solutions. Polymers comprising at least AMD and ATBS showed improved $t_{90}$, when compared to copolymers of AMD and AA of from about 60 to about 100%, or from about 60 to about 95%, or from about 63 to about 92%, or any value therebetween. The improvement in friction reduction and $t_{90}$ is even more pronounced in high Brine (Brine D), where polymers comprising at least AMD and ATBS monomers had improved Max FR, when compared to copolymers of AMD and AA, of from about 50 to about 75%, or from about 51 to about 65%, and had improved $t_{90}$ of from about 75 to about 95%, or from about 80 to about 90%, or any value therebetween.

Additional embodiments described herein include those in which the inversion of the emulsion is substantially complete in less than about 60 seconds. Use of the expression "substantially complete" denotes the time for about 90% of the emulsion to be inverted, also represented by $t_{90}$. Another embodiment includes a method of improving friction reduction properties of an aqueous treatment fluid by inverting a water-in-oil emulsion by adding the emulsion to an aqueous treatment fluid, in some embodiments an aqueous treatment fluid containing brine, where the water-in-oil emulsion includes:

(a) from about 10% to about 35% by weight of a friction reducing polymer, the polymer comprising from about 20 mole % to about 97.5 mole % of acrylamide and from about 2.5 mole % to about 80 mole % of at least one monomer selected from the group consisting of acrylic acid, acrylamido-tert-butyl sulfonic acid (ATBS), and mixtures thereof; and (b) about 0.1% to about 5% by weight of an inverting surfactant composition comprising one or more surfactants selected from the group consisting of ethoxylated alcohol compounds, ethoxylated fatty acid compounds, and alkyl polyethyleneglycol ether carboxylic acid compounds, and salts or esters thereof, wherein the composition comprises at least one or more alkyl polyethyleneglycol ether carboxylic acid compound.

In the preceding specification, various embodiments have been described with reference to the examples. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

What is claimed is:

1. An emulsion comprising:
   water;
   a water-immiscible liquid;
   greater than about 10% by weight of one or more polymers comprising one or more acrylamide monomers, and at least one anionic monomer, and salts and mixtures thereof; and
   about 0.1% to about 5% by weight of an inverting surfactant composition comprising one or more alkyl polyethyleneglycol ether carboxylic acid compounds or salts or esters thereof, one or more ethoxylated fatty acid compounds or salts or esters thereof, and one or more ethoxylated alcohol compounds or salts or esters thereof,
   wherein the one or more ethoxylated alcohol compounds or salts or esters thereof comprises a secondary alcohol ethoxylate of the formula $C_{11-15}H_{23-31}O(CH_2CH_2O)_{40}H$, and wherein the one or more ethoxylated alcohol compounds or salts or esters thereof is present in the inverting surfactant composition at a concentration of from about 10% to about 25% by weight based on the weight of the inverting surfactant composition,
   wherein the one or more alkyl polyethyleneglycol ether carboxylic acid compounds or salts or esters thereof is present in the inverting surfactant composition at a concentration of about 60% to about 75% by weight based on the weight of the inverting surfactant composition,
   wherein the one or more ethoxylated fatty acid compounds or salts or esters thereof is present in the inverting surfactant composition at a concentration of about 10% to about 25% by weight based on the weight of the inverting surfactant composition, and
   wherein when the emulsion is present in a brine at a temperature of 77 °F±3 °F, and a concentration of 0.5 grams per thousand gallons of the brine, and wherein the brine has 225,000 ppm of total dissolved solids, the emulsion achieves a maximum friction reduction (Max FR) of at least about 63%, and a time to 90% friction reduction ($t_{90}$) of about 21 seconds or less.

2. The emulsion of claim 1, wherein the one or more polymers comprises acrylamide, and at least one monomer selected from the group consisting of acrylic acid, acrylamido-tert-butyl sulfonic acid (ATBS), and mixtures thereof.

3. The emulsion of claim 1, wherein the one or more polymers comprises acrylamide in an amount of from about 80 mole % to about 90 mole % of the polymer and at least one monomer selected from the group consisting of acrylic acid, acrylamido-tert-butyl sulfonic acid (ATBS), and salts and mixtures thereof in an amount from about 10 mole % to about 20 mole % of the polymer.

4. The emulsion of claim 1, wherein the one or more polymers comprises one or more acrylamide monomers, one or more acrylamido-tert-butyl sulfonic acid (ATBS) monomers, and one or more acrylic acid monomers.

5. The emulsion of claim 1, wherein the one or more alkyl polyethyleneglycol ether carboxylic acid compounds is glycolic acid ethoxylate oleyl ether, and the one or more ethoxylated fatty acid compounds is ethoxylated castor oil.

6. A method of treating a portion of a subterranean formation, comprising: inverting the water-in-oil emulsion according to claim 1 by adding it to water to form a friction reducing treatment solution; and introducing the friction reducing treatment solution into the portion of the subterranean formation.

7. The method of claim 6, wherein the water-in-oil emulsion further comprises a proppant.

8. The method of claim 6, wherein the water comprises brine.

9. The method of claim 6, wherein the water has a total dissolved solids content (TDS) of about 0 ppm to about 300,000 ppm.

10. A method of treating a subterranean formation comprising:
(i) inverting a water-in-oil emulsion by adding the water-in-oil emulsion to an aqueous fluid to invert the water-in-oil emulsion and form a friction reducing treatment solution, wherein the water-in-oil emulsion comprises:
(a) water;
(b) a water-immiscible liquid;
(c) greater than about 10% by weight of one or more polymers comprising one or more acrylamide monomers, and at least one anionic monomer, and salts and mixtures thereof; and
(d) about 0.1% to about 5% by weight of an inverting surfactant composition comprising one or more alkyl polyethyleneglycol ether carboxylic acid compounds or salts or esters thereof, one or more ethoxylated fatty acid compounds or salts or esters thereof, and one or more ethoxylated alcohol compounds or salts or esters thereof,
wherein the one or more ethoxylated alcohol compounds or salts or esters thereof comprises a secondary alcohol ethoxylate of the formula $C_{11-15}H_{23-31}O(CH_2CH_2O)_{40}H$, and wherein the one or more ethoxylated alcohol compounds or salts or esters thereof is present in the inverting surfactant composition at a concentration of from about 10% to about 25% by weight based on the weight of the inverting surfactant composition,
wherein the one or more alkyl polyethyleneglycol ether carboxylic acid compounds or salts or esters thereof is present in the inverting surfactant composition at a concentration of about 60% to about 75% by weight based on the weight of the inverting surfactant composition,
wherein the one or more ethoxylated fatty acid compounds or salts or esters thereof is present in the inverting surfactant composition at a concentration of about 10% to about 25% by weight based on the weight of the inverting surfactant composition, and
wherein when the emulsion is present in a brine at a temperature of 77° F.±3° F. and a concentration of 0.5 grams per thousand gallons of the brine, and wherein the brine has 225,000 ppm of total dissolved solids, the emulsion achieves a maximum friction reduction (Max FR) of at least about 63%, and a time to 90% friction reduction (190) of about 21 seconds or less; and
(ii) introducing the friction reducing treatment solution into a subterranean formation.

\* \* \* \* \*